H. F. SNYDER.
GOVERNOR.
APPLICATION FILED JAN. 16, 1915.
1,195,286.
Patented Aug. 22, 1916.
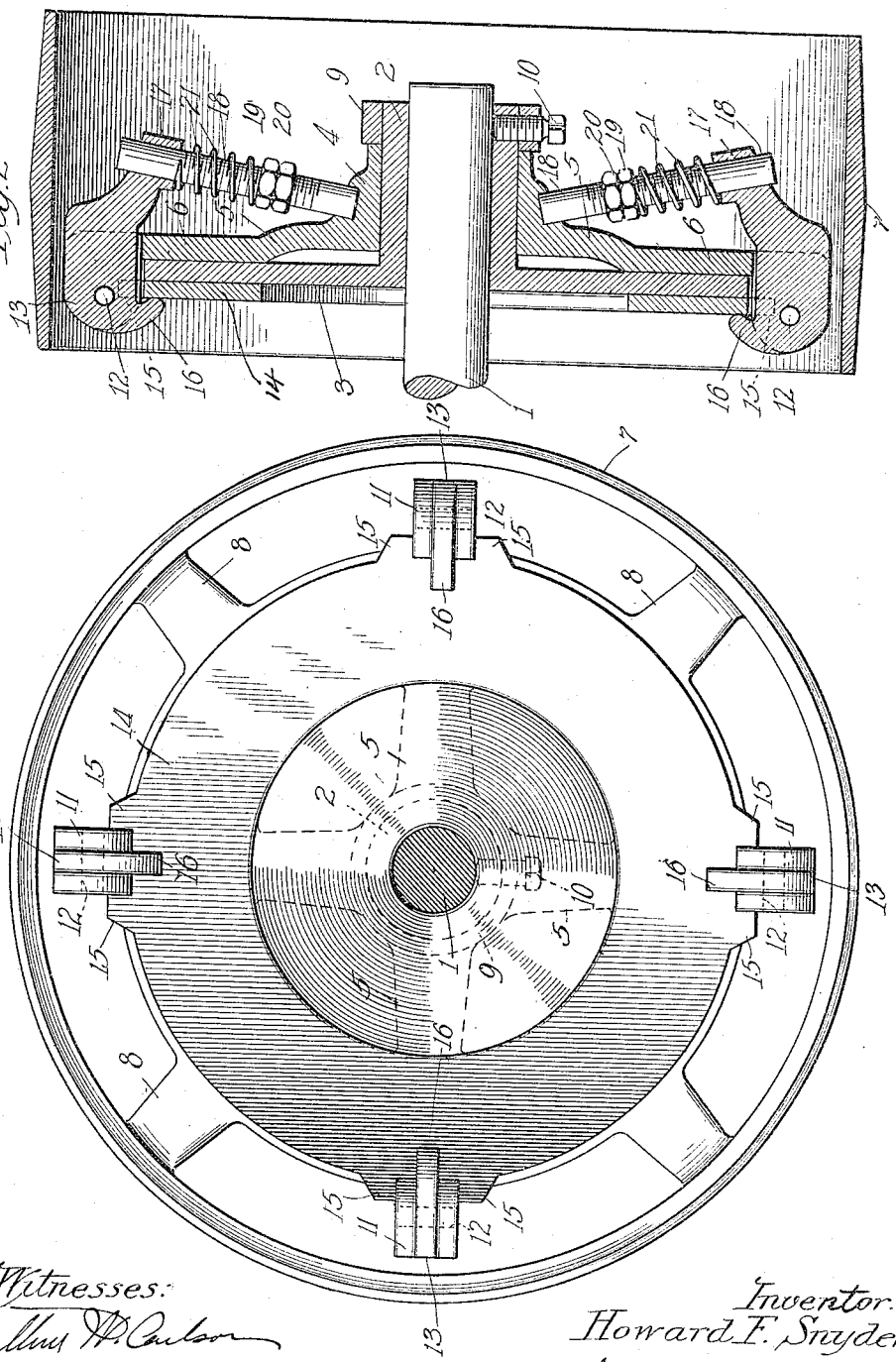

UNITED STATES PATENT OFFICE.

HOWARD F. SNYDER, OF NEWTON, IOWA, ASSIGNOR TO THE MAYTAG COMPANY, OF NEWTON, IOWA, A CORPORATION OF IOWA.

GOVERNOR.

1,195,286.   Specification of Letters Patent.   Patented Aug. 22, 1916.

Original application filed September 6, 1912, Serial No. 718,865. Divided and this application filed January 16, 1915. Serial No. 2,536.

*To all whom it may concern:*

Be it known that I, HOWARD F. SNYDER, a citizen of the United States, residing at Newton, in the county of Jasper and State of Iowa, have invented a new and useful Improvement in Governors, of which the following is a specification.

This invention relates to a governor or friction pulley capable of general application in the arts and finding special application in connection with threshing machine feeders; this application being a division of my application Serial No. 718,865, filed September 6, 1912, threshing machine feeders.

It is an object of this invention to provide a governor which is immediately susceptible to variations in the condition of the mechanism with which it is associated. Thus in the pending application above referred to my governor herein described and claimed is shown as applied to the shaft of a threshing machine feeder in such a fashion that an over supply of bundles to the thresher is instantly corrected by a slowing up of the feeding mechanism.

It is another object of my invention to produce a governor of simple and compact construction in which the working parts are entirely within the shell of the driving member.

It is another object of my invention to produce a governor in which the slipping point can be accurately and easily adjusted.

Other objects and advantages of the invention will appear as the description to follow proceeds.

In the drawing Figure 1 is an elevation of the governor of my invention. Fig. 2 is a cross-sectional view of the same.

Reference character 1 represents a shaft such as that of a threshing machine feeder upon which the governor pulley is applied.

Mounted upon the shaft 1 is an extended hub 2 integral with which is a flat disk 3. The hub 2 forms a bearing for the spider 4, the arms 5 of which carry the flat ring 6 connected to the band pulley 7 by means of the integral radial arms 8. The collar 9 upon the hub 2 keeps the pulley in place and is held itself in place by the set screw 10 which passes through the hub 2 and bears upon the shaft, thus also fixing the hub upon the shaft. The flat ring 6 carries four pairs of lugs 11 which project sidewise to overlap the disk 3 and afford a pivotal mounting at 12 for the levers 13. The friction disk 14 is provided with projecting lugs 15 which straddle the pairs of lugs 11 and thus hold the disk 14 in place. The levers 13 are provided at their forward ends with inturned, rounded noses 16 and at their rearward ends with extended arms 17 in which are sleeved the bolts 18, the other ends of which are seated in recesses in the hub of the spider 4. Upon the bolts 18 are mounted nuts 19 and lock nuts 20. Between the nuts 19 and the lever arms 17 are seated coil springs 21.

In operation it is obvious that the coil springs 21 tend to force the arms 17 outwardly and thus through the noses 16 to force the friction disk 14 against the flat disk 3 and to thus cause the disk 3 to rotate and drive the shaft 1 upon which it is fixedly mounted, provided the resistance is not too great to be overcome by the frictional engagement between the disks 14 and 3. The slipping point of the governor may obviously be adjusted with the utmost accuracy by positioning the nuts 19 so as to strengthen or weaken the thrust of the springs 21. When the nuts 19 are located in any desired position upon the bolts 18 they are locked in that position by the lock nuts 20.

I claim:

1. In apparatus of the class described, a driving shaft, a power regulator thereon comprising a belt pulley on said shaft, a friction device inside said belt pulley and adapted to limit the power applied thereby to the shaft, said device comprising friction disks, one whereof moves with the pulley and the other with the shaft, weight operated means and resilient means acting against said operative means for controlling the pressure between said friction disks.

2. In apparatus of the class described, a shaft, a hub having a disk thereon fixed upon the shaft, a spider freely revoluble on said hub, a pulley connected to said spider, a friction disk carried by said spider and means including levers for causing said friction disk to be forced against said first mentioned disk.

3. In apparatus of the class described, a shaft, a pulley on said shaft, a friction disk carried by said pulley, means comprising levers and resilient means acting on said levers for putting pressure on said friction disk, another friction disk on said shaft, adjustable means for regulating the pressure on said first mentioned friction disk.

4. In apparatus of the class described, a shaft, a hub, a disk thereon, a spider carrying a pulley, lugs on said spider overlying said first mentioned disk, a friction disk carried by said lugs, levers pivoted in said lugs and having inwardly turned noses for operating on said friction disk, resilient means mounted in said spider for causing said levers to act on said friction disk substantially as described.

In witness whereof, I hereunto subscribe my name to this specification in the presence of two witnesses.

HOWARD F. SNYDER.

Witnesses:
H. E. GALUSHA,
JARED LOVERIDGE.